(12) United States Patent
Hiroshima (10) Patent No.: US 8,110,832 B2
(45) Date of Patent: Feb. 7, 2012

(54) ELECTRO-OPTICAL SUBSTRATE, METHOD FOR DESIGNING THE SAME, ELECTRO-OPTICAL DEVICE, AND ELECTRONIC APPARATUS

(75) Inventor: Yasushi Hiroshima, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 363 days.

(21) Appl. No.: 12/034,846

(22) Filed: Feb. 21, 2008

(65) Prior Publication Data

US 2008/0203396 A1    Aug. 28, 2008

(30) Foreign Application Priority Data

Feb. 22, 2007  (JP) ................... 2007-041846
Jan. 18, 2008  (JP) ................... 2008-008805

(51) Int. Cl.
*H01L 27/146* (2006.01)

(52) U.S. Cl. ..... 257/72; 257/59; 257/344; 257/E27.026; 257/E27.027; 438/48

(58) Field of Classification Search ............ 257/59, 257/72, 79, 57, 344, 347, E27.026, E27.027, 257/E27.046, E31.127, E31.126, E37.026, 257/75, 428; 438/149, 48, 128, 151, 157, 438/283, 22, 479, 517; 349/44, 46, 100, 349/110, 106, 149, 143

See application file for complete search history.

(56) References Cited

U.S. PATENT DOCUMENTS

| | | | |
|---|---|---|---|
| 2002/0018278 A1* | 2/2002 | Sato | 359/245 |
| 2003/0143377 A1* | 7/2003 | Sano et al. | 428/156 |
| 2003/0189683 A1* | 10/2003 | Kurashina | 349/110 |
| 2004/0145018 A1* | 7/2004 | Inoue et al. | 257/347 |
| 2004/0149989 A1* | 8/2004 | Matsunaga et al. | 257/59 |

FOREIGN PATENT DOCUMENTS

JP    A 10-293320    11/1998

* cited by examiner

*Primary Examiner* — Cuong Q Nguyen

*Assistant Examiner* — Yosef Gebreyesus (74) *Attorney, Agent, or Firm* — Oliff & Berridge, PLC (57) ABSTRACT

An electro-optical substrate, including: a transparent substrate; a first light-shielding layer arranged on a first surface of the transparent substrate, in at least part of a region surrounding an opening in plan view; a first insulating layer arranged in a position facing the transparent substrate with the first light-shielding layer interposed therebetween, the first insulating layer having a refraction index n and a layer thickness t measured in nanometers, and covering at least part of the first light-shielding layer; a semiconductor layer, arranged in a position facing the transparent substrate, with the first light-shielding layer interposed therebetween, containing part of a thin film transistor, the thin film transistor including a channel region which is, in plan view, positioned within the first light-shielding layer, a corner edge of the first light-shielding layer and a corner edge of the channel region having a distance $L_c$ therebetween in nanometers, the distance $L_c$ satisfying relational expression 1: $nt^2 < 244 L_c$; a gate insulating layer covering the channel region; a gate electrode arranged in a region facing the channel region, with the gate insulating layer being interposed therebetween; a second insulating layer arranged to a position covering at least the gate electrode; and a second light-shielding layer provided in a position facing the semiconductor layer with the second insulating layer interposed therebetween, so as to cover at least the channel region.

10 Claims, 8 Drawing Sheets

ELECTRO-OPTICAL SUBSTRATE, METHOD FOR DESIGNING THE SAME, ELECTRO-OPTICAL DEVICE, AND ELECTRONIC APPARATUS

The entire disclosure of Japanese Patent Application Nos: 2007-041846, filed Feb. 22, 2007 and 2007-008805, filed Jan. 18, 2008 are expressly incorporated by reference herein.

BACKGROUND

1. Technical Field

The present invention relates to an electro-optical substrate, a method for designing the same, an electro-optical device, and an electronic apparatus.

2. Related Art

Liquid crystal panels used as electro-optical devices in electronic apparatus such as projectors receive light entering from one of the surfaces of the liquid crystal panel, and spatially modulate this light. Patterns such as images and characters are formed by emitting the specially modulated light from the other surface of the liquid crystal panel. Here, a structure is used, the light-shielding layer therein between the light source of this light and thin film transistors being used in order to suppress the generation of a photo leakage current originated by the light penetrating the channel regions of the thin film transistors that drive the liquid crystal panels.

There are cases, in which the light entering from one of the surfaces of the liquid crystal panel breaks off to stray light by the reflection from the other surface of the liquid crystal panel, and this stray light penetrates the semiconductor layer of the thin film transistor. A structure used in order to prevent such stray light from penetrating the thin film transistor includes a shielding layer provided between the thin film transistor and the electro-optical substrate. This light shielding layer prevents the stray light from directly penetrating the semiconductor layer of the thin film transistor.

In recent years, applying a silicon-on-insulator (SOI) technique has been examined as it becomes necessary for the write-in time per pixel to grow shorter and the image contrast to improve. Using the SOI technique allows replacing the polycrystalline thin film transistors with single crystalline thin film transistors that have high mobility, thereby providing high speed switching. JP-A-10-293320 describes a method for obtaining a light-shielding layer close to a substrate using the SOI technique. The manufacturing method includes: the forming of a light-shielding layer on an optically transparent substrate surface; covering the surface with a silicon oxide layer and planarizing it with polishing; bonding a single crystalline silicon substrate on the planer surface; and removing the single crystalline silicon substrate, leaving the thin layer of the single crystalline silicon, so as to form an SOI substrate.

Random-reflecting light is present in the interior of a display device provided with a liquid crystal panel, due to the multiple optical parts and components of the display device. Except for the light entering vertically to an electro-optical substrate in which thin film transistors are formed, the intensity of light obliquely penetrating the electro-optical substrate as the stray light is increasing. In recent years in particular, the brightness of the light source is increasing in order to obtain brighter images, and thus the stray light intensity penetrating the thin film transistor also tends to increase. In order to avoid the decline in the image display quality resulting from the generation of photo leakage currents generated by the stray light, an electro-optical substrate with a sufficient light-shielding property against the obliquely penetrating stray light is necessary.

If a single crystalline silicon layer with a high crystalline property (for instance, an SOI structure) is used as a semiconductor composing the thin film transistors, there is almost no recombination of carriers such as electrons and holes generated by the excitation caused by the penetration of stray light. Therefore, in order to reduce the generation of photo leakage currents caused by the penetration of stray light, the photo leakage currents passing through a source and a drain of a semiconductor device, a higher level of light-shielding property is required compared to the case where a polycrystalline silicon layer is used. According to the research of the inventor, there is a problem that in the case of using a single crystalline silicon layer, compared to the case of using a polycrystalline silicon layer with a larger amount of crystalline defects, the amount of the photo leakage current is increased by a factor of ten, resulting in a decline in the display image quality.

SUMMARY

An advantage of the invention is to provide an electro-optical substrate having thin film transistors in which the generation of the photo leakage current is reduced, as well as to provide an electro-optical device and an electronic apparatus.

In this document, "top" is the direction away from a substance constituting a substrate, further away through a first surface of the substrate. Moreover, an "opening" is defined as a portion in the regions that overlap with a pixel electrode, the portion contributing to displaying.

According to a first aspect of the invention, an electro-optical substrate includes: a transparent substrate; a first light-shielding layer arranged on a first surface of the transparent substrate, in at least part of a region surrounding an opening in plan view; a first insulating layer arranged in a position facing the transparent substrate with the first light-shielding layer interposed therebetween, the first insulating layer having a refraction index n and a layer thickness t measured in nanometers, and covering at least part of the first light-shielding layer; a semiconductor layer, arranged in a position facing the transparent substrate, with the first light-shielding layer interposed therebetween, containing part of a thin film transistor, the thin film transistor including a channel region which is, in plan view, positioned within the first light-shielding layer, a corner edge of the first light-shielding layer and a corner edge of the channel region having a distance $L_c$ therebetween in nanometers, the distance $L_c$ satisfying relational expression 1: $nt^2 < 244 L_c$; a gate insulating layer covering the channel region; a gate electrode arranged in a region facing the channel region, with the gate insulating layer being interposed therebetween; a second insulating layer arranged to a position covering at least the gate electrode; and a second light-shielding layer provided in a position facing the semiconductor layer with the second insulating layer interposed therebetween, so as to cover at least the channel region.

In this structure, the penetration depth of the stray light is expressed, based on the formula of Rayleigh diffraction limit, in the following relational expression 5:

$$t < (0.61 * \lambda)/(n * \sin\theta)$$

where $\lambda$ (nm) is the wavelength of stray light, t (nm) is the layer thickness of the first insulating layer (equivalent to a light guide layer), n is the refraction index of the first insulating layer, and $\theta$ is the penetration angle of the stray light.

Here, if "$\lambda$" is smaller, "t" must fulfill conditions which are more limiting, and thus, "$\lambda$" is set to 400 nm, which is the shortest wavelength of the visible light. If sin θ (the opposite side divided by the hypotenuse) is expressed using the distance $L_c$ (nm) between the corner edge of the first light-shielding layer and the corner edge of the channel region, the relationship becomes sin θ=t/$L_c$, the length of the hypotenuse corresponding to $L_c$ and the layer thickness of the light guide layer corresponding to t. Assigning this relationship to relational expression 5 produces $nt^2 < 244 L_c$ (relational expression 1).

Satisfying the positional relationship described in relational expression 1 allows the corner edge of the channel region to be arranged in a position exceeding the penetration limit of stray light. Consequently, generation of a photo leak current is reduced, the photo leak current being originated from the stray light penetrating the channel region. Reducing the generation of photo leak currents originated from stray light allows reducing the noise generation caused by the stray light, thereby providing the electro-optical substrate with a high image quality.

In this case, in the electro-optical substrate, the semiconductor layer includes: the thin film transistor having a lightly doped drain (LDD) region; the distance $L_c$ between the corner edge of the first light-shielding layer and the corner edge of the channel region satisfying relational expression 1; and a distance $L_l$ measured in nanometers between the corner edge of the first light-shielding layer and the corner edge of the lightly doped drain region satisfying relational expression 2: $nt^2 < 244 L_l$.

In this structure, the channel region and the LDD regions are arranged in a position exceeding the penetration depth of stray light. Satisfying the positional relationship described in relational expression 1 ($nt^2 < 244 L_c$) and relational expression 2 allows the channel region and the LDD regions to be arranged in a position exceeding the penetration limit of stray light. Consequently, generation of photo leak current is reduced, the photo leak current being originated from the stray light penetrating the channel region, as well as from the LDD regions. Reducing the generation of photo leak current originated from stray light also in the LDD regions allows reducing the noise generation caused by the stray light, thereby providing the electro-optical substrate with a high image quality.

According to a second aspect of the invention, an electro-optical substrate includes: a transparent substrate; a first light-shielding layer arranged on a first surface of the transparent substrate, in at least part of a region surrounding an opening in plan view; a first insulating layer arranged in a position facing the transparent substrate with the first light-shielding layer interposed therebetween, the first insulating layer having a refraction index n and a layer thickness t being in nanometers, and covering at least part of the first light-shielding layer; a semiconductor layer, arranged in a position facing the transparent substrate, with the first light-shielding layer interposed therebetween, containing part of a thin film transistor, the thin film transistor including a channel region which is, in plan view, positioned within the first light-shielding layer, a corner edge of the first light-shielding layer having a distance $X_c$ nanometers from a feet of a perpendicular dropped from a corner edge of the channel region to the first light-shielding layer, the distance $X_c$ satisfying relational expression 3: $t(n^2 t^2 - 0.3721 \lambda^2)^{0.5} < 0.61 \lambda X_c$ where $\lambda$ is the shortest wavelength of light incident to the transparent substrate, $\lambda$ measured in nanometers; a gate insulating layer covering the channel region; a gate electrode arranged in a region facing the channel region, with the gate insulating layer being interposed therebetween; a second insulating layer arranged to a position covering at least the gate electrode; and a second light-shielding layer provided in a position facing the semiconductor layer with the second insulating layer interposed therebetween, so as to cover at least the channel region.

In this structure, the penetration depth of the stray light is expressed in the following relational expression 5:

$t < (0.61 * \lambda)/(n * \sin \lambda)$, where $\lambda$ (nm) is the wavelength of stray light, t (nm) is the layer thickness of the first insulating layer (equivalent to a light guide layer), n is the refraction index of the first insulating layer, and θ is the penetration angle of the stray light. Here, $\lambda$ is the shortest wavelength of light entering into the substrate. If sin $\lambda$ (the opposite side divided by the hypotenuse) is expressed using the distance $X_c$ (nm) between the corner edge of the first light-shielding layer and a feet of a perpendicular dropped from the corner edge of the channel region to the first light-shielding layer, the relationship becomes sin θ=t/$(X_x^2+t^2)^{0.5}$, the length of the hypotenuse corresponding to $(X_c^2+t^2)^{0.5}$ and the layer thickness of the light guide layer corresponding to t (nm). Assigning this into relational expression 5 provides the following relational expression 3:

$$t(n^2 t^2 - 0.3721 \lambda^2)^{0.5} < 0.61 \lambda X_c$$

Arranging the channel region so as to satisfy relational expression 3 allows the corner edge of the channel region to be arranged in a position exceeding the penetration limit of the stray light. Consequently, generation of a photo leak current is reduced, the photo leak current being originated from the stray light penetrating the channel region. Reducing the noise originated from the stray light allows providing the electro-optical substrate with a high image quality.

In this case, in the electro-optical substrate, the semiconductor layer includes: the thin film transistor having a lightly doped drain (LDD) region; the distance $L_c$ between the corner edge of the first light-shielding layer and the corner edge of the channel region satisfying relational expression 3; and a distance $X_l$ measured in nanometers between the corner edge of the first light-shielding layer and a feet of a perpendicular dropped from a corner edge of the lightly doped drain region to the first light-shielding layer, the distance $X_l$ satisfying relational expression 4: $t(n^2 t^2 - 0.3721 \lambda^2)^{0.5} < 0.61 \lambda X_l$; where $\lambda$ is the shortest wavelength of light incident to the transparent substrate, $\lambda$ measured in nanometers.

In this structure, the penetration depth of the stray light is expressed in the following relational expression 5;

$t < (0.61 * \lambda)/*(n * \sin θ)$ where $\lambda$ (nm) is the wavelength of stray light, t (nm) is the layer thickness of the first insulating layer (equivalent to a light guide layer), n is the refraction index of the first insulating layer, and θ is the penetration angle of the stray light.

Here, $\lambda$ is the shortest wavelength of light entering into the substrate. If sin θ (the opposite side divided by the hypotenuse) is expressed using the distance $X_l$ (nm) between the corner edge of the first light-shielding layer and a feet of a perpendicular dropped from the corner edge of the LDD region to the first light-shielding layer, the relationship becomes sin θ=t/$(X_l^2+t^2)^{0.5}$, the length of the hypotenuse corresponding to $(X_l^2+t^2)^{0.5}$ and the layer thickness of the light guide layer corresponding to t (nm). The following formula is obtained by using this relationship.

$$t(n^2 t^2 - 0.3721 \lambda^2)^{0.5} < 0.61 \lambda X_l \quad \text{(relational expression 4)}$$

Arranging the channel region and the LDD regions so as to satisfy relational expressions 3 and 4 allows the corner edges of the channel region and of the LDD region to be arranged in a position exceeding the penetration limit of the stray light. Consequently, generation of a photo leak current is reduced, the photo leak current originated from the stray light penetrating the channel region and the LDD region. Reducing the noise originated from the stray light allows providing the electro-optical substrate with a high image quality.

According to a third aspect of the invention, a method for designing an electro-optical substrate includes: designing the electro-optical substrate so that a distance $L_c$ measured in nanometers between a corner edge of a first light-shielding layer and a corner edge of a channel region satisfies relational expression 1: $nt^2 < 244L_c$. Here, the electro-optical substrate includes: a transparent substrate; the first light-shielding layer arranged on a first surface of the transparent substrate in at least part of a region surrounding an opening in plan view; a first insulating layer arranged in a position facing the transparent substrate with the first light-shielding layer interposed therebetween, the first insulating layer having a refraction index n and a layer thickness t being in nanometers, and covering at least part of the first light-shielding layer; and a thin film transistor including the channel region which is, in plan view, positioned within the first light-shielding layer, the thin film transistor being arranged in a position facing the transparent substrate, with the first light-shielding layer interposed therebetween.

Using this design method allows designing the arrangement of the channel region in a position exceeding the penetration depth of stray light. Moreover, the photo leak current is effectively reduced by designing the distances such as distance $L_c$ to satisfy the above formula which is a function of the distance $L_c$ between the first light-shielding layer and the channel region to the first light-shielding layer.

According to a fourth aspect of the invention, a method for designing an electro-optical substrate includes: designing the electro-optical substrate so that a distance $X_c$ measured in nanometers between a corner edge of a first light-shielding layer and a feet of a perpendicular dropped from a corner edge of a channel region to the first light-shielding layer satisfies relational expression 3: $t(n^2t^2 - 0.3721\lambda^2)^{0.5} < 0.61\lambda X_c$; where $\lambda$ is the shortest wavelength of light incident to a transparent substrate, $\lambda$ measured in nanometers. Here, the electro-optical substrate includes: the transparent substrate; the first light-shielding layer arranged on a first surface of the transparent substrate, in at least part of a region surrounding an opening in plan view; a first insulating layer arranged in a position facing the transparent substrate with the first light-shielding layer interposed therebetween, the first insulating layer having a refraction index n and a layer thickness t being in nanometers, and covering at least part of the first light-shielding layer; and a part of a thin film transistor including the channel region which is, in plan view, positioned within the first light-shielding layer, the thin film transistor being arranged in a position facing the transparent substrate, with the first light-shielding layer interposed therebetween.

Using this design method allows designing the arrangement of the channel region in a position exceeding the penetration depth of stray light, corresponding to the shortest wavelength of the incident light. Moreover, the photo leak current is effectively reduced by designing the distance $X_c$ to satisfy the above formula which is a function of the distance $X_c$ between the first light-shielding layer and a feet of a perpendicular dropped from the channel region to the first light-shielding layer.

According to a fifth aspect of the invention, a method for designing an electro-optical substrate includes: designing the electro-optical substrate so that a distance $L_l$ measured in nanometers between a corner edge of a first light-shielding layer and a corner edge of a lightly doped drain (LDD) region satisfies relational expression 2: $nt^2 < 244L_l$. Here, the electro-optical substrate includes: a transparent substrate; the first light-shielding layer arranged on a first surface of the transparent substrate, in at least part of a region surrounding an opening in plan view; a first insulating layer arranged in a position facing the transparent substrate with the first light-shielding layer interposed therebetween, the first insulating layer having a refraction index n and a layer thickness t being in nanometers, and covering at least part of the first light-shielding layer; and a thin film transistor including the lightly doped drain region which is, in plan view, positioned within the first light-shielding layer, the thin film transistor being arranged in a position facing the transparent substrate, with the first light-shielding layer interposed therebetween.

Using this design method allows designing the arrangement of the LDD region in a position exceeding the penetration depth of stray light. Moreover, the photo leak current is effectively reduced by designing the distances such as distance $L_l$ to satisfy the above formula which is a function of the distance $L_l$ between the first light-shielding layer and the LDD region.

According to a sixth aspect of the invention, a method for designing an electro-optical substrate includes: designing the electro-optical substrate so that a distance $X_l$ measured in nanometers between a corner edge of a first light-shielding layer and a feet of a perpendicular dropped from a corner edge of a lightly doped drain region to the first light-shielding layer satisfies relational expression 4: $t(n^2t^2 - 0.3721\lambda^2)^{0.5} < 0.61\lambda X_l$; where $\lambda$ is the shortest wavelength of light incident to a transparent substrate, $\lambda$ measured in nanometers. Here, the electro-optical substrate includes: the transparent substrate; the first light-shielding layer arranged on a first surface of the transparent substrate, in at least part of a region surrounding an opening in plan view; a first insulating layer arranged in a position facing the transparent substrate with the first light-shielding layer interposed therebetween, the first insulating layer having a refraction index n and a layer thickness t being in nanometers, and covering at least part of the first light-shielding layer; and a part of a thin film transistor including the lightly doped drain region which is, in plan view, positioned within the first light-shielding layer, the thin film transistor being arranged in a position facing the transparent substrate, with the first light-shielding layer interposed therebetween.

Using this design method allows designing the arrangement of the LDD region in a position exceeding the penetration depth of stray light, in accordance with the shortest wavelength of the incident light. Moreover, the photo leak current is effectively reduced by designing the distance $X_l$ to satisfy the above formula which is a function of the distance $X_c$ between the first light-shielding layer and a feet of a perpendicular dropped from the channel region to the first light-shielding layer.

According to a seventh aspect of the invention, an electro-optical device includes the electro-optical substrate described above.

Since the electro-optical device includes the electro-optical substrate in which the generation of the photo leakage current caused by stray light is reduced, an electro-optical device that allows display in high luminance is provided.

According to an eighth aspect of the invention, an electronic apparatus includes the electro-optical device described above.

Since the electronic apparatus includes the electro-optical device that allows display in high luminance, an electronic apparatus including a display unit with high visibility is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
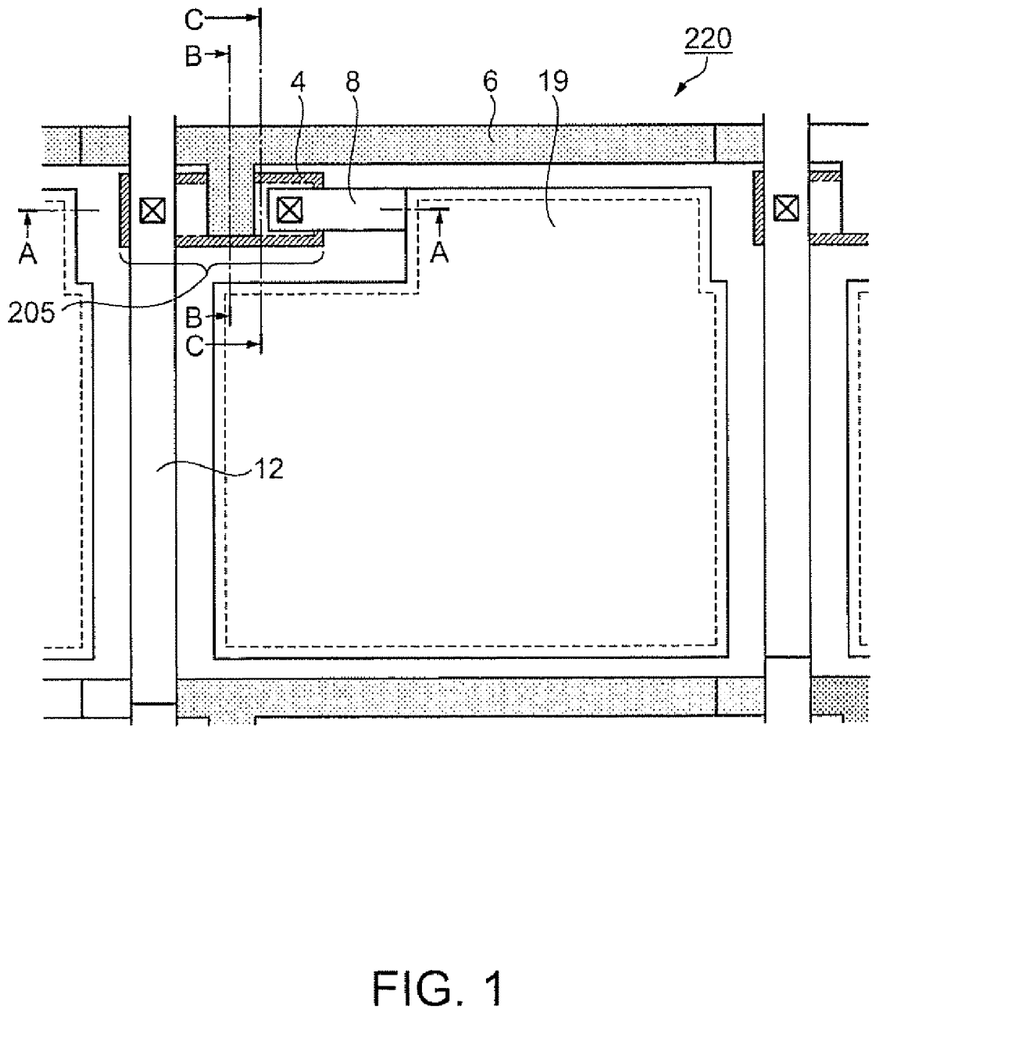
FIG. 1 is a plan view of an electro-optical substrate including a thin film transistor.

The first embodiment will now be described using the drawings. FIG. 1 is a plan view of an electro-optical substrate 220 including a thin film transistor 205. The thin film transistor 205 is driven through a signal line 12 and a gate line 6. A drain electrode 8 is coupled with a pixel electrode 19 which is formed with, for instance, indium tin oxide, so as to control electric potentials of the pixel electrode 19.

Figure 2:
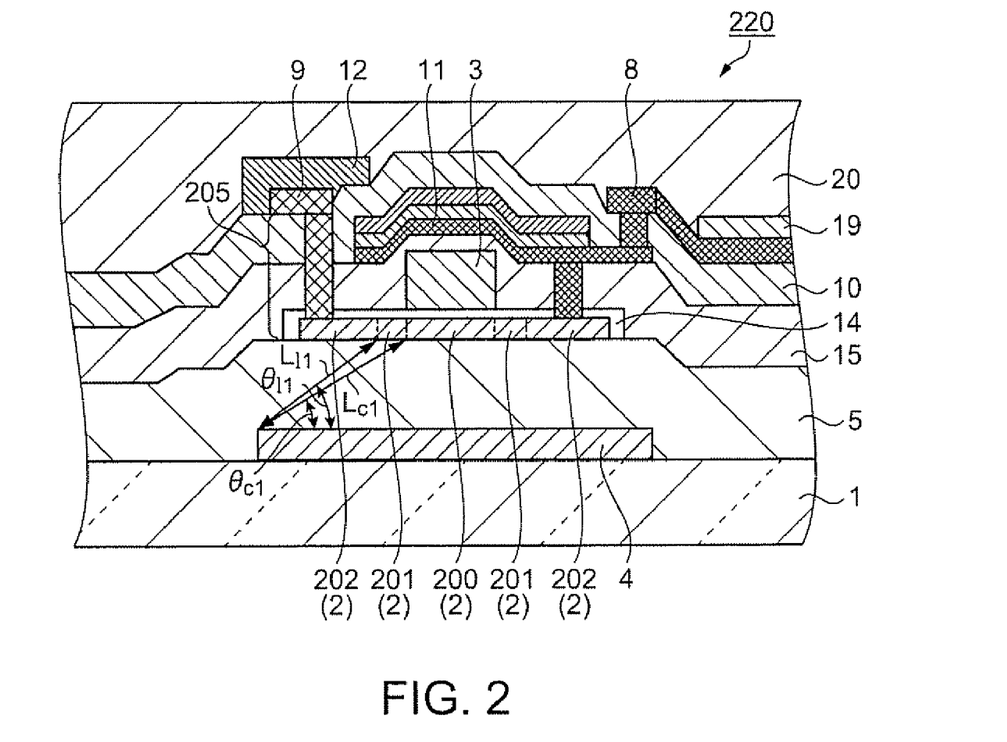
FIG. 2 is a sectional drawing of a line A-A along the longitudinal direction of a channel.

FIG. 2 is a sectional drawing of FIG. 1 along a line A-A. A first light-shielding layer 4 formed with tungsten silicide is formed on a quartz substrate 1 as a transparent substrate. The layer thickness of the first light-shielding layer 4 may be, for instance, approximately 100 to 1000 nm. Here, alternating materials of tungsten silicide used in the first light-shielding layer 4 may include polycrystalline silicon, molybdenum silicide, and metals which can withstand the maximum temperature for forming the electro-optical substrate 220, the examples of the metals including, molybdenum, tungsten, and tantalum.

A first insulating layer 5 in which oxide silicon is used, is arranged so as to cover the first light-shielding layer 4. The layer thickness of the first insulating layer 5 is t (nm), and a refraction index is "n", where "n" is typically 1.5 in case the oxide silicon is used in the first insulating layer 5. The thin film transistor 205 is arranged so as to cover part of the first insulating layer 5, and to include a channel region 200 which is, in plan view, positioned within the first light-shielding layer 4.

The thin film transistor 205 includes the channel region 200, LDD regions 201 arranged on both sides of the channel region 200, and source/drain regions 202. A silicon layer 2 is used in those regions. A gate electrode 3 is arranged thereon, having a gate insulating layer 14 therebetween. Polysilicon is used as a material for the gate electrode 3. Instead of polysilicon, materials that may be used for the gate electrode 3 include a conductive material that withstand the maximum temperature in the processes subsequent to forming the gate electrode 3 included in the thin film transistor 205. Specifically, materials such as tungsten silicide, molybdenum, tungsten, tantalum, and molybdenum silicide may be used. Oxide silicon, for instance, may be used for the gate insulating layer 14.

A first interlayer insulating layer 15 that serves as a second insulating layer composed of oxide silicon is arranged in a position covering the channel region 200, the LDD regions 201, the source/drain regions 202, and the gate electrode 3 in the thin film transistor 205. Moreover, a drain electrode 8 and a source electrode 9 are formed, both penetrating through the first interlayer insulating layer 15 and the gate insulating layer 14, so as to couple the source/drain regions 202. Further, a second interlayer insulating layer 10 is positioned, so as to cover the first interlayer insulating layer 15.

In a region where the drain electrode 8 is positioned on the second interlayer insulating layer 10, the drain electrode 8 and part of the pixel electrode 19 are arranged to overlap, so as to provide an electrical continuity between the drain electrode 8 and the pixel electrode 19. The second light-shielding layer 20 that is formed with, for instance, black polyimide resin is arranged so as to cover at least the channel region 200 of the thin film transistor 205. Here, a polysilicon layer obtained by modifying amorphous silicon may be used as the silicon layer 2. A single-crystalline silicon layer formed by lamination may also be used.

A drain line 11 may be a structure alternative to the second light-shielding layer 20 formed with black polyimide resin, in order to shield the light in at least the channel region 200 of the thin film transistor 205. In this case, the aperture ratio which is higher compared the case of using black polyimide resin is obtained, since the light-shielding region may be formed more precisely.

Figure 3:
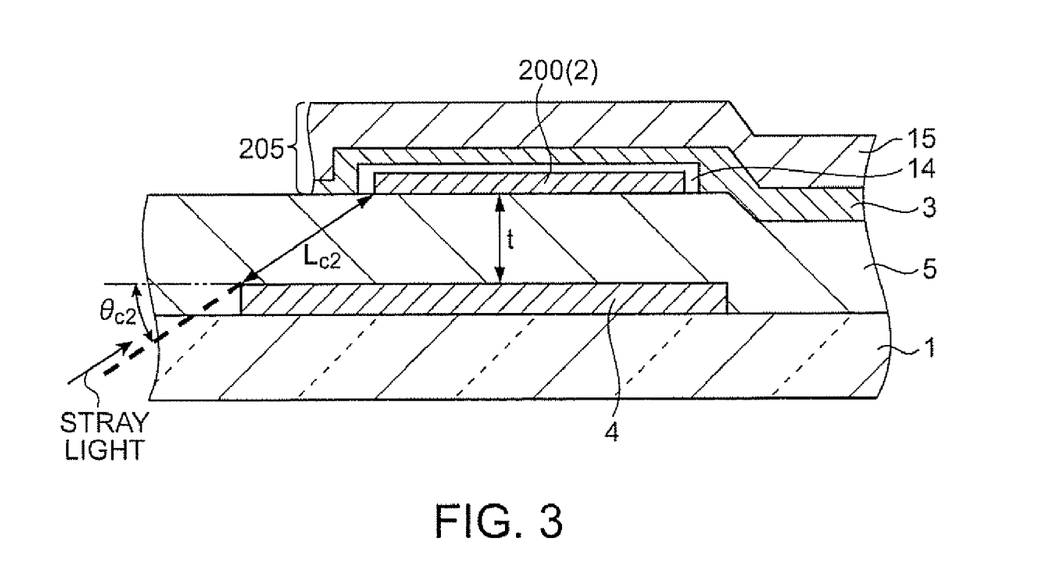
FIG. 3 is a sectional drawing of a line B-B along the width direction of the channel.

Referring to FIG. 3, a light waveguide mechanism will now be described for the case in which the stray light penetrates the channel region 200 of the thin film transistor 205 in a penetration angle $\theta_{c2}$. FIG. 3 is a sectional drawing of FIG. 1 along a line B-B. The illustration is omitted in FIG. 3 for the part not related to the propagation of stray light. As shown in FIG. 3, the first light-shielding layer 4, the first insulating layer 5, and the channel region 200 (silicon layer 2) constitute a light wave guide, if the stray light penetrates the thin film transistor 205 in the penetration angle $\theta_{c2}$. The allowable penetration depth of the stray light is expressed in the following relational expression 5a:

$$t < (0.61 * \lambda)/(n * \sin \theta_{c2})$$

where "t" is a layer thickness of the first insulating layer 5 (nm), "n" is the refraction index, and "$\theta_{c2}$" is the penetration angle of the stray light.

In relational expression 5a, $\sin \theta_{c2}$ is represented as the opposite side divided by the hypotenuse. This relationship can also be expressed as $t/L_{c2}$, where "t" is a layer thickness (nm) and "$L_{c2}$" is a distance (nm). If λ is 400 nm which is the shortest wavelength of visible light, the condition that should be satisfied by $L_{c2}$ becomes $nt^2 < 244L_{c2}$, which is the same as relational expression 1.

Typically, the first insulating layer 5 is formed with oxide silicon with the refraction index of 1.5, and the distance $L_{c2}$ (nm) from the first insulating layer 5 to the channel region 200 is set to less than 500 nm. In this case, the allowable layer thickness of the first insulating layer 5 is calculated by relational expression 1. Here, the penetration of stray light into the channel region 200 is suppressed by setting the first insulating layer 5 to less than 285 nm. Moreover, a distance $L_{c1}$ (nm) shown in FIG. 2 satisfying the same relationship as that of the distance $L_{c2}$ allows suppressing the penetration of stray light in the longitudinal direction of the thin film transistor 205. As shown in FIG. 2, the description is made for a structure in which the thin film transistor 205 includes the LDD regions 201. However, in this structure, the LDD regions 201 are not mandatory elements, and may be omitted.

In order to further suppress the photo leak current, in addition to the conditions of keeping the distance between the corner edge of the channel region 200 and the corner edge of the first light-shielding layer 4 at $L_{c1}$(nm) and $L_{c2}$(nm), a similar method of suppressing the penetration of stray light may be applied in setting the position of a corner edge of each of the LDD regions 201 in FIG. 2. Like the above, the penetration of stray light into the LDD regions 201 can be suppressed, further reducing the photo leak current. This is achieved by arranging each of the LDD regions 201 so that a distance $L_{l1}$ (nm) between a corner edge of one of the LDD region 201 and a corner edge of the first light-shielding layer 4 shown in FIG. 2 satisfies the relationship $nt^2 < 244L_{l1}$, and making a distance $L_{l2}$ (nm) shown in FIG. 10 (a sectional drawing of FIG. 1 along C-C line) satisfying $nt^2 < 244L_{l2}$.

Second Embodiment

Example of Laminate Structure

Figure 4:
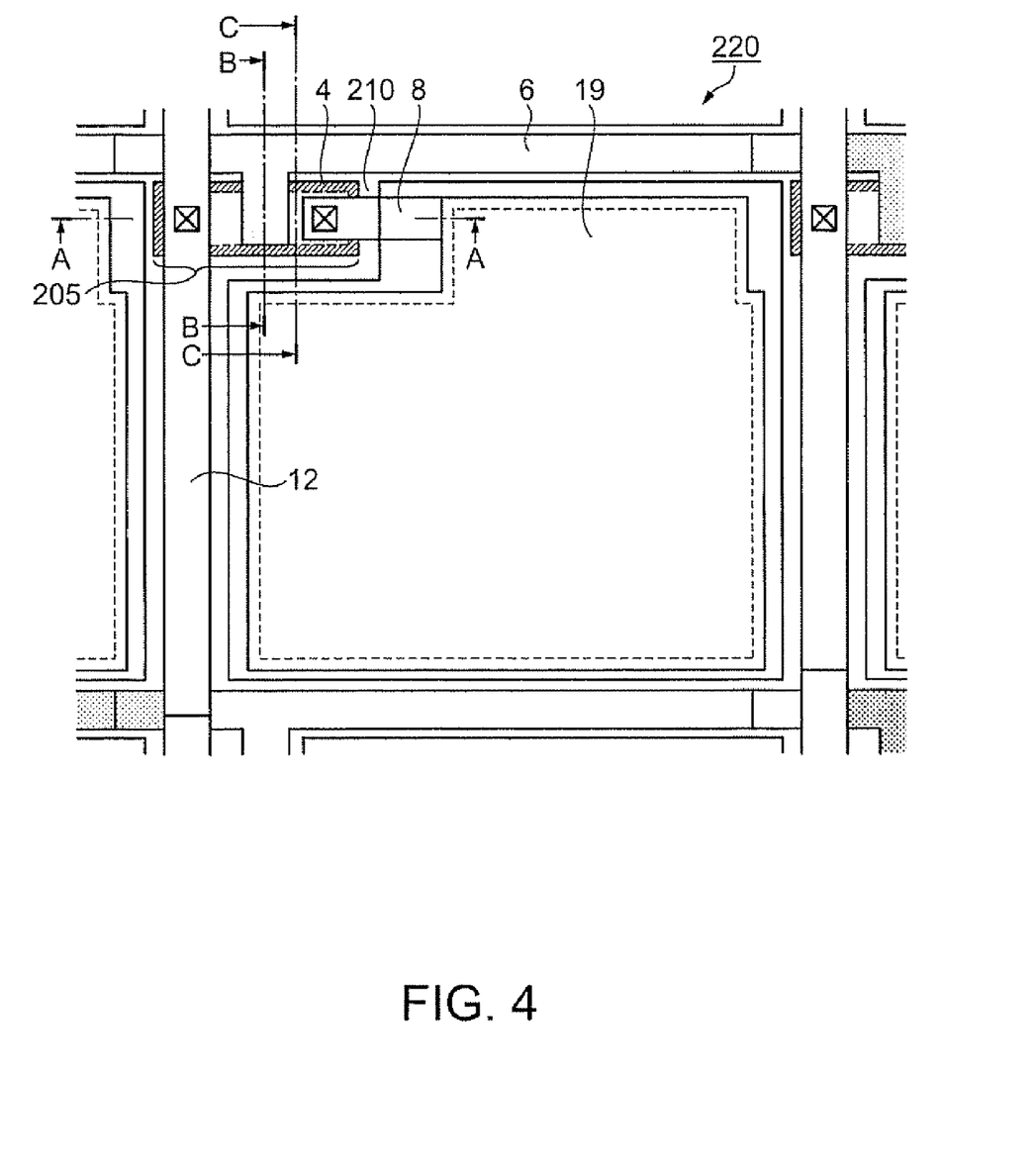
FIG. 4 is a plan view of an electro-optical substrate including a thin film transistor.

The second embodiment will now be described using the drawings. FIG. 4 is a plan view of the electro-optical substrate 220 including the thin film transistor 205. The second embodiment is different from the first embodiment in that the first insulating layer 5 has a laminate structure of a buffer layer and a dense layer. Here, a laminate includes two layers. However, the second embodiment may be deployed to the case of using a laminate structure with multiple layers. In other words, by considering the refraction index and the layer thickness of each layer constituting the laminate structure, the channel region 200 can be arranged to a position beyond the penetration depth of stray light, as in the first embodiment. A specific example of the laminate will be described.

As shown in FIG. 4, the thin film transistor 205 is driven through the signal line 12 and the gate line 6, and the drain electrode 8 is coupled with the pixel electrode 19 which is formed with, for instance, indium tin oxide (ITO), so as to control electric potentials of the pixel electrode 19. A dense layer 210 containing, for instance, silicon nitride is arranged, in plan view, in a region including the thin film transistor 205.

Figure 5:
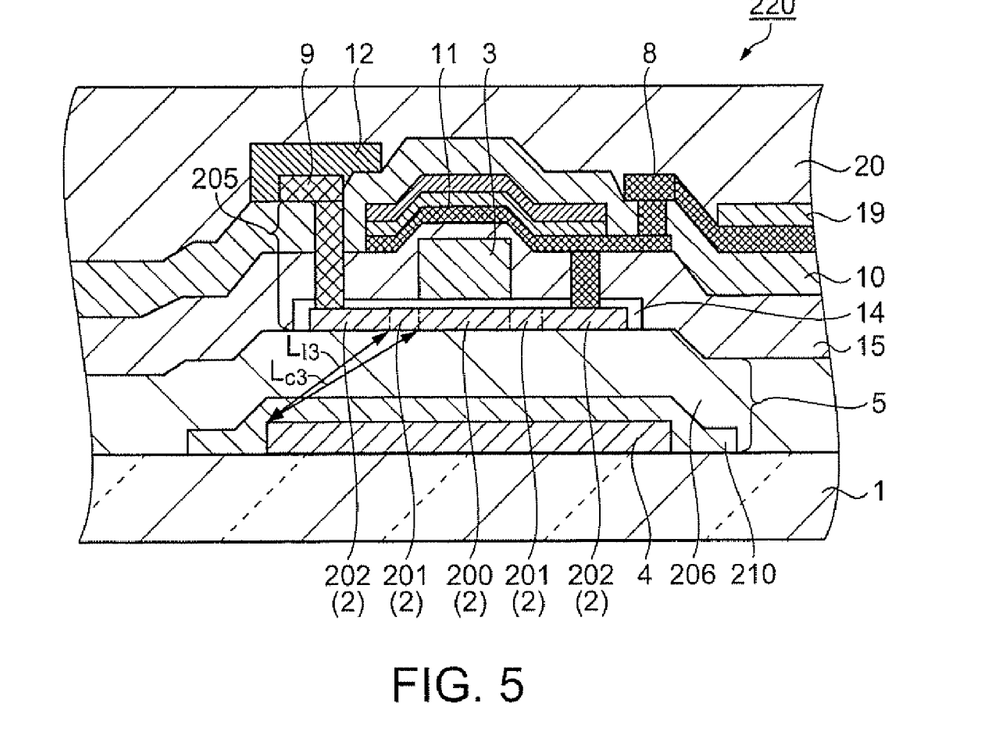
FIG. 5 is a sectional drawing of a line A-A along the longitudinal direction of a channel.
Figure 6:
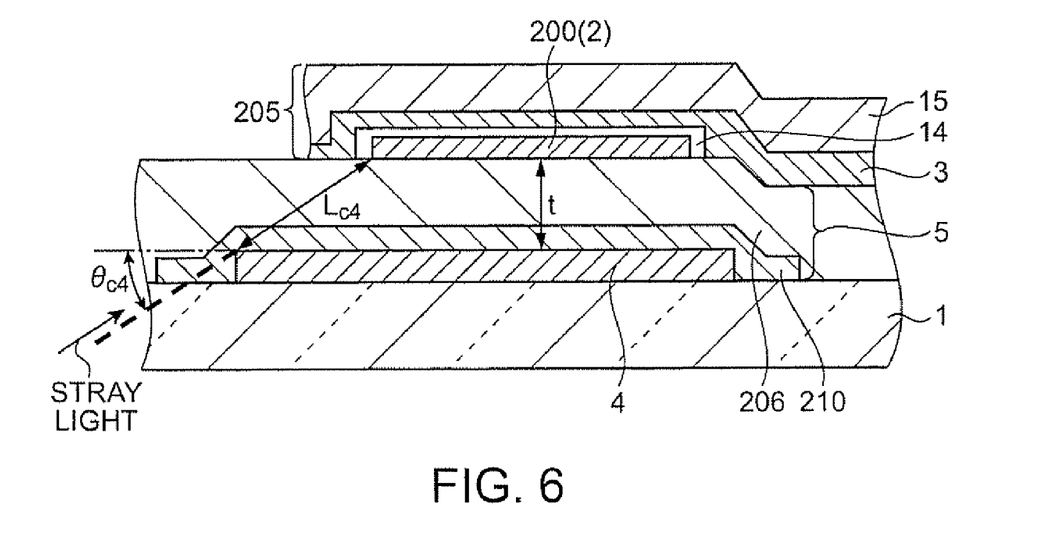
FIG. 6 is a sectional drawing of a line B-B along the width direction of the channel.

FIG. 5 is a sectional drawing of FIG. 4 along a line A-A, and FIG. 6 is a sectional drawing of FIG. 4 along a line B-B. The first light-shielding layer 4 formed with tungsten silicide is formed on the quartz substrate 1 as a transparent substrate. The layer thickness of the first light-shielding layer 4 may be, for instance, approximately 100 to 1000 nm. Here, alternating materials of tungsten silicide used in the first light-shielding layer 4 may include polycrystalline silicon, molybdenum silicide, and metals which can withstand the maximum temperature for forming the electro-optical substrate 220, the examples of the metals including, molybdenum, tungsten, and tantalum.

A buffer layer 206 in which, for instance, oxide silicon is used is arranged so as to cover the first light-shielding layer 4. The layer thickness of the buffer layer 206 is $t_2$ (nm), and the refraction index is "$n_2$", where "$n_2$" is typically 1.5 if the oxide silicon is used in the buffer layer 206. The dense layer 210 having a dense property is arranged between the buffer layer 206 and the first light-shielding layer 4. The dense layer 210 is formed with, for instance, silicon nitride. Here, the layer thickness and the refraction index of the dense layer 210 is respectively "$t_1$" (nm) and "$n_1$", and the typical refraction index of the silicon nitride that may be used in the dense layer 210 is 2.1. The light transmittance of silicon nitride is distributed in the visible light wavelength band. Therefore, when using the silicon nitride as the dense layer 210, the dense layer 210 should desirably be arranged in a region either inside a region of the first light-shielding layer 4 or a region covered by the second light-shielding layer 20 as described later, so that the denese layer 210 avoids the opening. The buffer layer 206 and the dense layer 210 are collectively defined as the first insulating layer 5. Alternating materials of silicon nitride for the dense layer 210 may include a multilayer film containing silicon nitride and silicon oxide, and a multilayer film containing substance with refraction index different from others such as hafnium oxide. The second embodiment describes the case where silicon oxide and silicon nitride are respectively used for the buffer layer 206 and the dense layer 210. Since silicon nitride has a low impurity diffusion coefficient, it reduces the contamination caused by the diffusion of impurities contained in the quartz substrate 1 or metallic constituent contained in the first light-shielding layer 4, the impurities diffusing into the silicon layer 2 shown in FIG. 5.

The thin film transistor 205 is arranged so as to cover part of the first insulating layer 5, and to include a channel region 200 which is positioned, in plan view, within the first light-shielding layer 4. The thin film transistor 205 includes the channel region 200, the LDD regions 201 arranged on both sides of the channel region 200, and the source/drain regions 202. The same silicon layer 2 is used in those regions. A gate electrode 3 is arranged thereon, having a gate insulating layer 14 therebetween. Polysilicon is used as a material for the gate electrode 3. Instead of polysilicon, the gate electrode 3 may be formed with materials such as tungsten silicide, molybdenum, tungsten, tantalum, and molybdenum silicide, which are the conductive materials that withstand the maximum temperature in the processes for forming the electro-optical substrate 220 after forming the gate electrode 3. As for the gate insulating layer 14, oxide silicon is used.

A first interlayer insulating layer 15 composed of oxide silicon is arranged in a position covering the channel region 200, the LDD regions 201, the source/drain regions 202, and the gate electrode 3 in the thin film transistor 205. Moreover, a drain electrode 8 and a source electrode 9 are formed, both penetrating through the first interlayer insulating layer 15 and the gate insulating layer 14, so as to couple the source/drain regions 202. Further, the second interlayer insulating layer 10 is positioned, so as to cover the first interlayer insulating layer 15. The second interlayer insulating layer 10 is opened so as to expose the drain electrode 8. The drain electrode 8 and the pixel electrode 19 are arranged so that they have an electrical continuity therebetween. The second light-shielding layer 20 that is formed with, for instance, black polyimide resin is arranged so as to cover at least the channel region 200 of the thin film transistor 205. Here, a polysilicon layer obtained by modifying amorphous silicon may be used as the silicon layer 2. A single-crystalline silicon layer formed by lamination may also be used. Here, the penetration of stray light is reduced by setting a distance $L_{c4}$ (shown in FIG. 6) between the corner edge of the first light-shielding layer 4 and the corner edge of the channel region 200 to satisfy the same relationship as that of the first embodiment. Similarly, the penetration of stray light is reduced by setting a distance $L_{c3}$ shown in FIG. 5 in the same manner.

Figure 11:
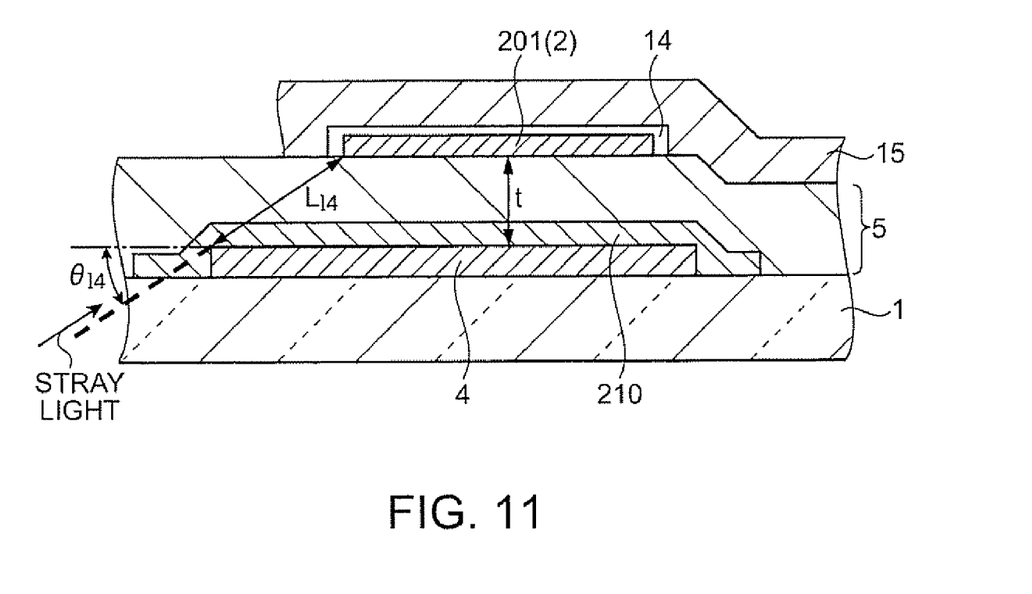
FIG. 11 is a C-C line sectional drawing of an LDD region along the width direction of the channel in FIG. 4.

In order to further reduce the photo leak current, it is preferable to reduce the penetration of stray light into the LDD regions 201. In this case, in addition to the conditions of keeping the distance between the corner edge of the channel region 200 and the corner edge of the first light-shielding layer 4 at $L_{c3}$, the penetration of stray light is reduced by setting a distance $L_{l3}$ (nm) shown in FIG. 5 to satisfy the same relationship as that of the first embodiment, the distance $L_{l3}$ being between the corner edge of one of the LDD regions 201 and the corner edge of the first light-shielding layer 4. Moreover, setting a distance $L_{l4}$ (nm) shown in FIG. 11 (a sectional drawing of FIG. 4 along C-C line) to satisfy the same relationship as that of the first embodiment allows suppressing the penetration of stray light into the LDD regions 201, further reducing the dark current.

Third Embodiment

In the third embodiment, the description is made for designing a distance $X_c$ (nm) and a wavelength $\lambda$ (nm) relative to the refraction index "n" and the layer thickness "t" of the first insulating layer 5, where the distance $X_c$ is a distance between the corner edge of the first light-shielding layer 4 and a feet of a perpendicular dropped from the corner edge of the channel region 200 to the first light-shielding layer 4, and the wavelength $\lambda$ is the shortest wavelength of light incident to the transparent substrate (electro-optical substrate).

Figure 12:
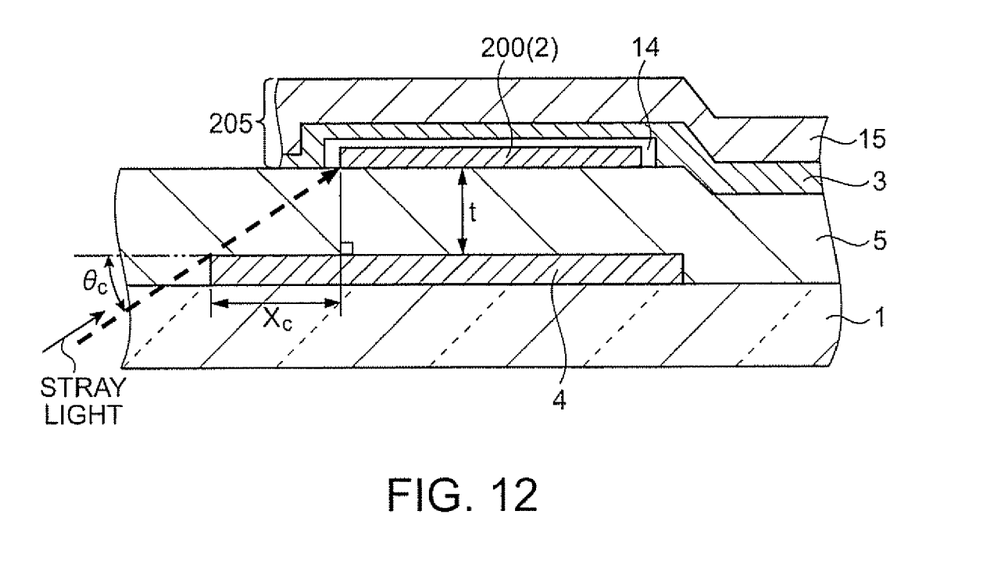
FIG. 12 is a sectional drawing of a line B-B along the width direction of the channel in FIG. 1.

FIG. 12, similar to FIG. 3, is a drawing that illustrates a state where the stray light is penetrating the channel region 200 of the thin film transistor 205 in the penetration angle $\theta_c$. In order to avoid the stray light from reaching the channel region 200, based on the formula of Rayleigh diffraction limit, terms should satisfy the following relational expression 5b:

$$t<(0.61*\lambda)/(n*\sin\theta_c)$$

In relational expression 5b, sin θc is represented as the opposite side divided by the hypotenuse, and this relationship can also be expressed as $t/(X_c^2+t^2)^{0.5}$, where "t" is a layer thickness (nm) and "$(X_c^2+t^2)^{0.5}$" is a distance (nm). Assigning this into relational expression 5b and simplifying the formula provides the following relational expressions 1 and 3. Here, relational expression 1 represents a case where the wavelength $\lambda$ is 400 nm.

$$nt^2<244L_c \quad \text{(relational expression 1)}$$

$$t(n^2t^2-0.3721\lambda^2)^{0.5}<0.61\lambda X_c \quad \text{(relational expression 3)}$$

As described, the penetration of stray light into the channel region 200 is prevented by controlling the distance $X_c$ (nm) and the layer thickness "t" of the first insulating layer 5 to satisfy the above relational expressions relative to the refraction index "n" of the first insulating layer 5 and the shortest wavelength $\lambda$ (nm) of the incident light, where the distance $X_c$ is a distance between the corner edge of the first light-shielding layer 4 and a feet of a perpendicular dropped from the corner edge of the channel region 200 to the first light-shielding layer 4. Consequently, noises caused by the stray light is reduced, and the electro-optical substrate with a high image quality is provided.

In other words, when designing the thin film transistor according to the third embodiment, it is preferable to select "t", "$L_c$", and "$X_c$" so as to satisfy the relationships expressed in the relational expressions 1 and 3. For instance, if the electro-optical substrate is produced in higher definition, the area per pixel shrinks and $L_c$ and $X_c$ become smaller. Here, the light shielding property is maintained by scaling down t to satisfy relational expressions 1 and 3.

Fourth Embodiment

In the fourth embodiment, the description is made for setting a distance $X_l$ (nm) and the wavelength $\lambda$ (nm) relative to the refraction index "n" and the layer thickness "t" of the first insulating layer 5, where the distance $X_l$ is a distance between the corner edge of the first light-shielding layer 4 and a feet of a perpendicular dropped from the corner edge of one of the LDD regions 201 to the first light-shielding layer 4, and the wavelength $\lambda$ is the shortest wavelength of light incident to the transparent substrate (electro-optical substrate).

Figure 10:
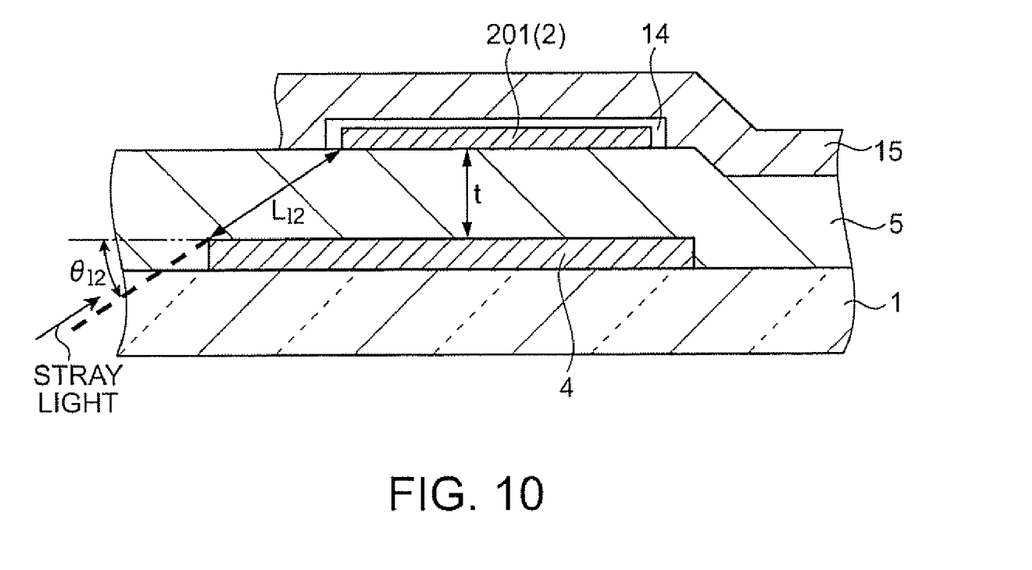
FIG. 10 is a C-C line sectional drawing of an LDD region along the width direction of the channel in FIG. 1.
Figure 13:
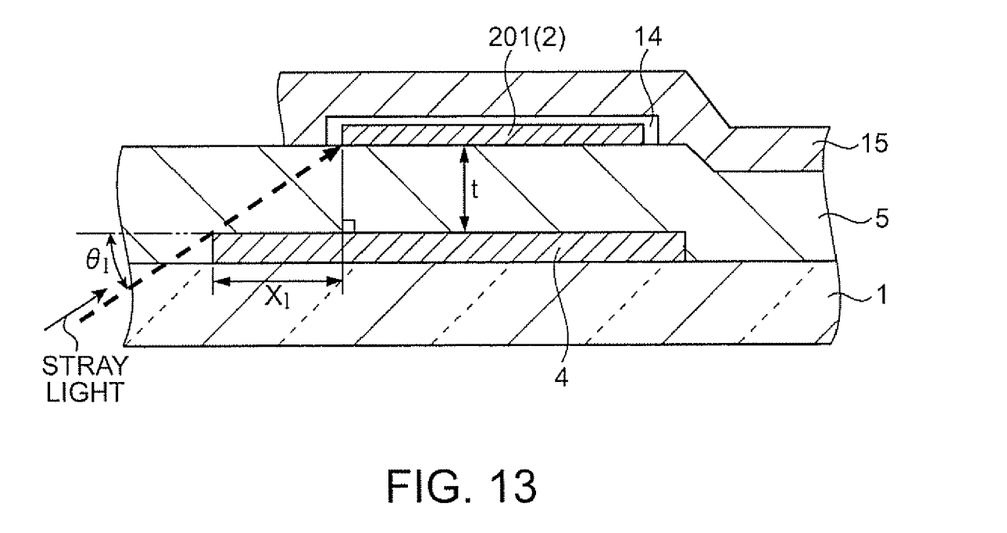
FIG. 13 is a C-C line sectional drawing of the LDD region along the width direction of the channel in FIG. 1.

FIG. 13, similar to FIG. 10, is a drawing that illustrates a state where the stray light is penetrating one of the LDD regions 201 of the thin film transistor 205 in the penetration angle $\theta_1$. In order to avoid the stray light from reaching the LDD regions 201, based on the formula of Rayleigh diffraction limit, terms should satisfy the following relational expression 5c:

$$t<(0.61*\lambda)/(n*\sin\theta_1)$$

In relational expression 5c, sin θ1 is represented as the opposite side divided by the hypotenuse, and this relationship can also be expressed as $t/(X_l^2+t^2)^{0.5}$, where "t" is the layer thickness (nm) and "$(X_l^2+t^2)^{0.5}$" is the distance (nm). Assigning this into relational expression 5c and simplifying the formula provides the following formulae. Here, relational expression 2 represents a case when the wavelength $\lambda$ is 400 nm.

$$nt^2<244L_l \quad \text{(relational expression 2)}$$

$$t(n^2t^2-0.3721\lambda^2)^{0.5}<0.61\lambda X_l \quad \text{(relational expression 4)}$$

As described, the penetration of stray light into the LDD regions 201 is prevented by controlling the distance $X_l$ and the layer thickness "t" of the first insulating layer 5 to satisfy the above relational expression relative to the refraction index "n" of the first insulating layer 5 and the shortest wavelength $\lambda$ (nm) of the incident light, where the distance $X_l$ is a distance between the corner edge of the first light-shielding layer 4 and a feet of a perpendicular dropped from the corner edge of one of the LDD regions 201 to the first light-shielding layer 4. Consequently, noises caused by the stray light is reduced and an electro-optical substrate with a high image quality is provided.

In other words, when designing the thin film transistor according to the third embodiment, it is preferable to select "t", "$L_l$", and "$X_l$" so as to satisfy the relationships expressed in the relational expressions 2 and 4. For instance, as electro-optical substrates being produced in higher precision, the area per pixel shrinks and $L_l$ and $X_l$ become smaller. Here, the light shielding property is maintained by scaling down $L_l$ and $X_l$ to satisfy relational expressions 2 and 4. That is to say, relational expressions 2 and 4 indicate the upper limit of the layer thickness "t" of the insulating layer.

Fifth Embodiment

Figure 7:
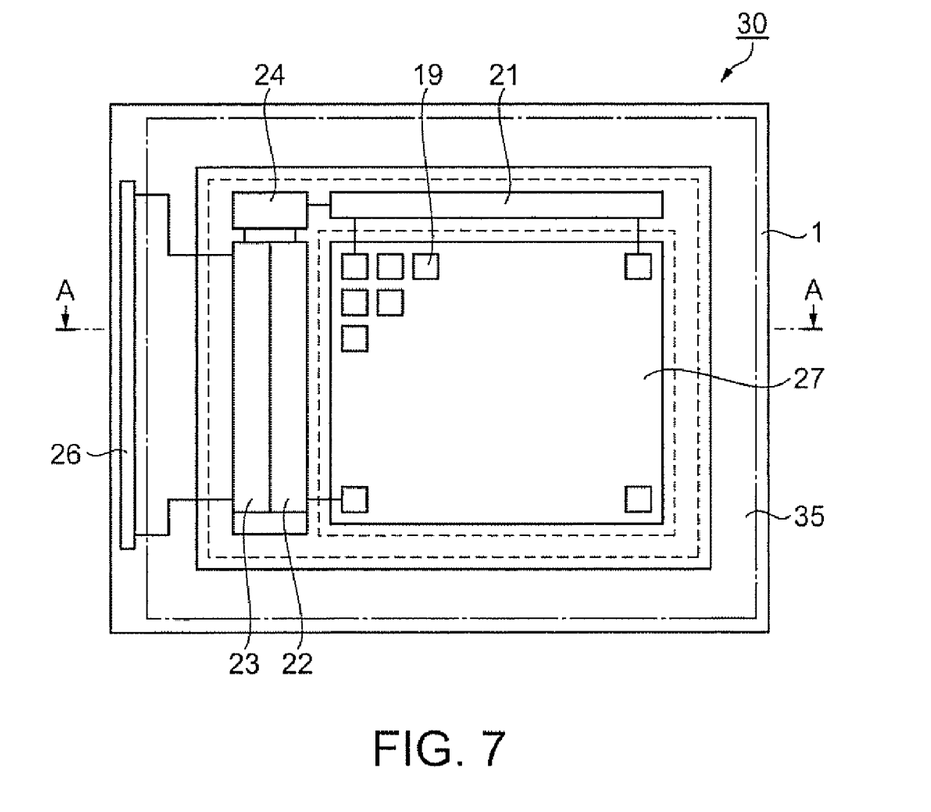
FIG. 7 is a plan view of a liquid crystal panel as an electro-optical device.

An electro-optical device including the electro-optical substrate described above will now be described as a fifth embodiment. As shown in FIG. 7, a liquid crystal panel 30 is produced having a display pixel region 27 provided on the quartz substrate 1 as a transparent substrate, and having the pixel electrodes 19 arranged in matrix. A drive circuit is formed around the display pixel region 27 for processing display signals. A gate line drive circuit 21 sequentially scans un-illustrated gate signal lines, and a data line drive circuit 22 supplies image signals corresponding to the image data to un-illustrated source signal lines. Other circuits are also provided, such as an input circuit 23 for retrieving image data externally input through a pad region 26, and a timing control circuit 24 that controls these circuits.

Figure 8:
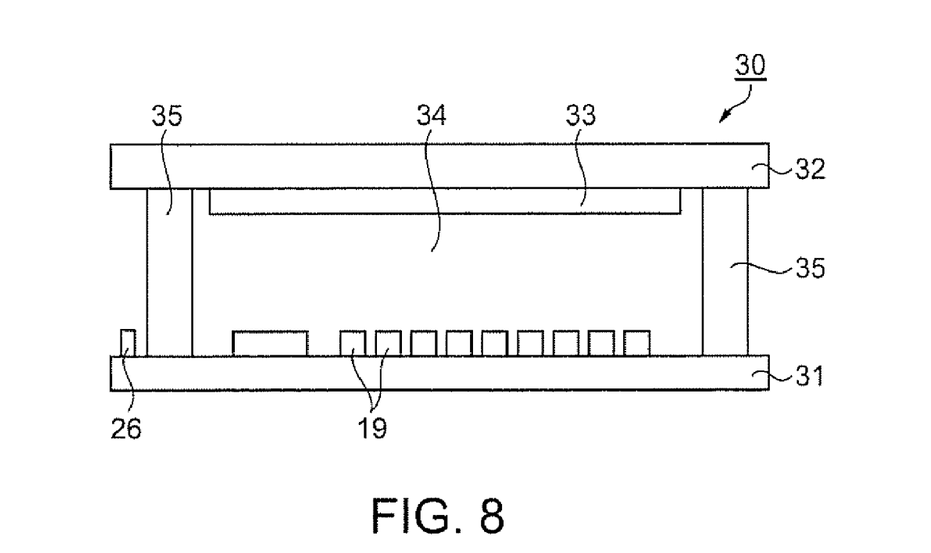
FIG. 8 is a sectional drawing of the liquid crystal panel as an electro-optical device along an A-A line.

FIG. 8 is a sectional drawing of the liquid crystal panel in FIG. 7 along a line A-A. A liquid crystal panel 30 includes a substrate 31 and a transparent substrate 32 arranged having a prescribed gap therebetween. The substrate 31 includes the display pixels and the drive circuit formed thereon, and a transparent substrate 32 includes, as transparent conductive layer, counter electrodes 33 that are formed with, for instance, ITO. Within the gap, the periphery thereof being sealed by a sealer 35, liquid crystal is filled, examples of the liquid crystal including twisted nematic (TN) liquid crystal 34 and super homeotropic (SH) liquid crystal that has liquid crystal molecules being orientated approximately vertically in a state where no voltage is impressed. The above is a structure of the liquid crystal panel 30 as an electro-optical device. A location for providing the sealer 35 is set so that the pad region 26 is positioned outside of the sealer 35, in order for the signals to be input externally. In the liquid crystal panel 30, as described above, the penetration of stray light is prevented in the oblique direction, the stray light penetrating at least the channel region 200 of the thin film transistor 205. Therefore, such liquid crystal panel 30 as an electro-optical device is preferably applied in using a high luminance light source, where the intensity of stray light is strong.

Sixth Embodiment

Figure 9:
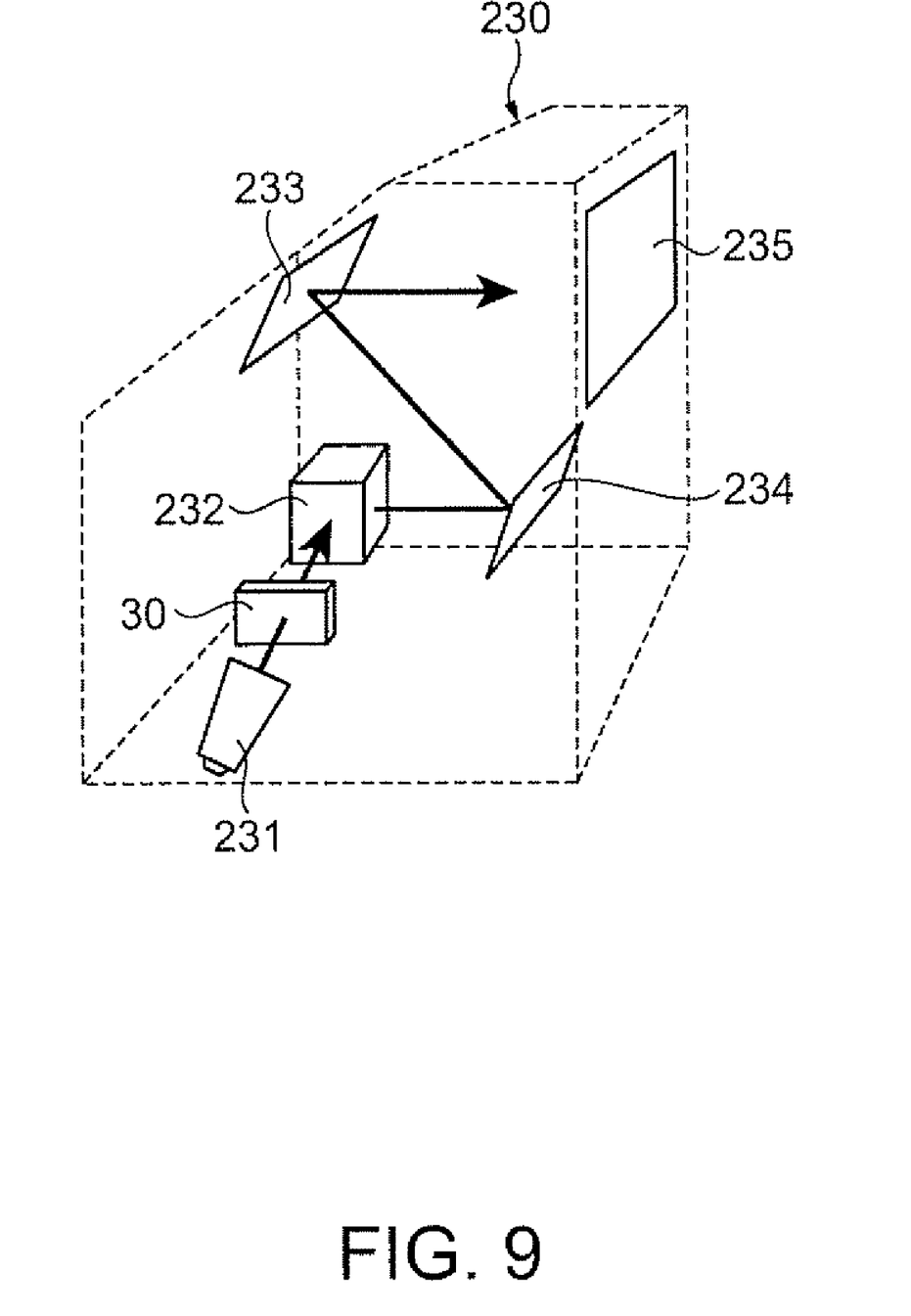
FIG. 9 is a schematic view of a rear projector in which the liquid crystal panel is mounted.

An electronic apparatus including the liquid crystal panel as the electro-optical device described above will now be described as a sixth embodiment. FIG. 9 is a schematic view of a rear projector as an electronic apparatus in which the liquid crystal panel is mounted as the aforementioned electro-optical device. The liquid crystal panel 30 is used as a light valve in a rear projector 230. The liquid crystal panel 30 attributes image information to the light supplied from a light source 231. An optical system 232 controls the pencil. The image is displayed on a screen 235 with a reflecting mirror 233 and a reflecting mirror 234. The light intensity penetrating the liquid crystal panel 30 used in the rear projector 230 is extremely high, as is the quality of image required. Since the light intensity is high, the intensity of stray light thereof is also high. The liquid crystal panel 30 having the above structure can suppress the effect of this stray light. Therefore, the rear projector 230 including the liquid crystal panel 30 as an electronic apparatus reduces the effect oriented from stray light, thereby realizing a high image quality of the output image. Examples of application except for the rear projector 230 include electronic apparatuses such as a front projector, a mobile phone, a video camera, a fax device with a display function, a view-finder of a digital camera, a mobile television, a digital signal processor (DSP) device, a personal digital assistants (PDA), an electronic notebook, an electrical bulletin board, a display for advertising, and an integrated circuit (IC) card.

Modification

In the embodiments described above, the descriptions were made for a case in which top gate thin film transistors are used, but bottom gate thin film transistors may also be used.

What is claimed is:

1. An electro-optical substrate, comprising:
a transparent substrate;
a first light-shielding layer arranged on a first surface of the transparent substrate, in at least part of a region surrounding an opening in plan view, the first light-shielding layer having a thickness of 100 to 1,000 nanometers;
a first insulating layer arranged in a position facing the transparent substrate with the first light-shielding layer interposed therebetween, the first insulating layer having a refraction index n and a layer thickness t of less than 285 nanometers, and covering at least part of the first light-shielding layer, the first insulating layer comprising a dense layer and a buffer layer covering the first light-shielding layer;
a semiconductor layer, arranged in a position facing the transparent substrate, with the first light-shielding layer interposed therebetween, containing part of a thin film transistor, the thin film transistor including a channel region which is, in plan view, positioned within the first light-shielding layer, a corner edge of the first light-shielding layer and a corner edge of the channel region having a distance $L_c$ therebetween in nanometers, the distance $L_c$ being less than 500 nanometers and satisfying relational expression 1:

$$nt^2 < 244 L_c$$

a gate insulating layer covering the channel region;
a gate electrode arranged in a region facing the channel region, with the gate insulating layer being interposed therebetween;
a second insulating layer arranged to a position covering at least the gate electrode; and
a second light-shielding layer provided in a position facing the semiconductor layer with the second insulating layer interposed therebetween, so as to cover at least the channel region, wherein
the dense layer is arranged entirely inside a region covered by the second light-shielding layer so that the dense layer avoids the opening in plan view.

2. The electro-optical substrate according to claim 1, wherein:
the semiconductor layer includes:
the thin film transistor having a lightly doped drain region;
the distance $L_c$ between the corner edge of the first light-shielding layer and the corner edge of the channel region satisfying relational expression 1; and
a distance $L_l$ measured in nanometers between the corner edge of the first light-shielding layer and the corner edge of the lightly doped drain region satisfying relational expression 2:

$$nt^2 < 244 L_l.$$

3. An electronic apparatus comprising the electro-optical substrate according to claim 1.

4. An electronic apparatus comprising the electro-optical device according to claim 3.

5. The electro-optical substrate according to claim 1, wherein the buffer layer comprises silicon oxide and the dense layer comprises silicon nitride.

6. The electro-optical substrate according to claim 1, wherein the dense layer covers at least an upper surface and a side surface of the first light-shielding layer.

7. An electro-optical substrate, comprising:
a transparent substrate;
a first light-shielding layer arranged on a first surface of the transparent substrate, in at least part of a region surrounding an opening in plan view, the first light-shielding layer having a thickness of 100 to 1,000 nanometers;
a first insulating layer arranged in a position facing the transparent substrate with the first light-shielding layer interposed therebetween, the first insulating layer having a refraction index n and a layer thickness t of less than 285 nanometers, and covering at least part of the first light-shielding layer, the first insulating layer comprising a dense layer and a buffer layer covering the first light-shielding layer;
a semiconductor layer, arranged in a position facing the transparent substrate, with the first light-shielding layer interposed therebetween, containing part of a thin film transistor, the thin film transistor including a channel region which is, in plan view, positioned within the first light-shielding layer, a corner edge of the first light-shielding layer having a distance $X_c$ in nanometers from a feet of a perpendicular dropped from a corner edge of the channel region to the first light-shielding layer, the distance $X_c$ satisfying relational expression 3:

$$t(n^2 t^2 - 0.3721\lambda^2)^{0.5} < 0.61\lambda X_c$$

where $\lambda$ is the shortest wavelength of light incident to the transparent substrate, $\lambda$ measured in nanometers;
a gate insulating layer covering the channel region;
a gate electrode arranged in a region facing the channel region, with the gate insulating layer being interposed therebetween;
a second insulating layer arranged to a position covering at least the gate electrode; and
a second light-shielding layer provided in a position facing the semiconductor layer with the second insulating layer interposed therebetween, so as to cover at least the channel region, wherein
the dense layer is arranged entirely inside a region covered by the second light-shielding layer so that the dense layer avoids the opening in plan view.

8. The electro-optical substrate according to claim 7, wherein:
the semiconductor layer includes:
the thin film transistor having a lightly doped drain region;
the distance $L_c$ between the corner edge of the first light-shielding layer and the corner edge of the channel region satisfying relational expression 3; and
a distance $X_l$ measured in nanometers between the corner edge of the first light-shielding layer and a feet of a perpendicular dropped from a corner edge of the lightly doped drain region to the first light-shielding layer, the distance $X_l$ satisfying relational expression 4:

$$t(n^2 t^2 - 0.3721\lambda^2)^{0.5} < 0.61\lambda X_l$$

where $\lambda$ is the shortest wavelength of light incident to the transparent substrate, $\lambda$ measured in nanometers.

9. The electro-optical substrate according to claim 7, wherein the buffer layer comprises silicon oxide and the dense layer comprises silicon nitride.

10. The electro-optical substrate according to claim 7, wherein the dense layer covers at least an upper surface and a side surface of the first light-shielding layer.

* * * * *